United States Patent [19]

Dhawan

[11] Patent Number: 4,564,835
[45] Date of Patent: Jan. 14, 1986

[54] FIELD-COUPLED POINTING DEVICE

[76] Inventor: Satish K. Dhawan, 36 Anita St., New Haven, Conn. 06511

[21] Appl. No.: 449,238

[22] Filed: Dec. 13, 1982

[51] Int. Cl.⁴ .............................................. G09G 3/00
[52] U.S. Cl. ...................................... 340/710; 178/18; 178/19
[58] Field of Search ...................... 340/710; 178/18, 19

[56] References Cited

U.S. PATENT DOCUMENTS

| | | | |
|---|---|---|---|
| 3,530,437 | 9/1970 | Booker et al. | 178/18 |
| 3,532,817 | 10/1970 | Jones et al. | 178/18 |
| 3,700,809 | 10/1972 | Nadon | 178/18 X |
| 3,873,770 | 3/1975 | Ioannov | 178/18 |
| 3,886,311 | 5/1975 | Rodgers et al. | 178/18 |
| 4,240,065 | 12/1980 | Howbrook | 178/18 X |
| 4,364,035 | 12/1982 | Kirsch | 340/710 |
| 4,390,873 | 6/1983 | Kirsch | 340/710 |
| 4,418,242 | 11/1983 | Kouno | 178/18 X |
| 4,471,162 | 9/1984 | Aono et al. | 178/18 X |

Primary Examiner—Gerald L. Brigance
Assistant Examiner—Vincent P. Kovalick
Attorney, Agent, or Firm—Cifelli, Frederick & Tully

[57] ABSTRACT

A pointing device comprises a mouse tablet having a regular repetitive pattern of field sensitive pixels on the surface thereof, and a mouse including coupling elements movable across the mouse tablet, wherein the coupling elements establish position-dependent field coupling with the pixels. Analysis of the coupling yields mouse motion and direction of motion. In one embodiment, the pixels are deployed in rows and columns and a pair of coupling elements are provided for sensing motion and direction of motion in each axis. The coupling elements are elongated to be non-responsive in the axis of non-interest, and are spaced apart to provide phase-shifted output from which direction of motion can be determined. In another embodiment, ferrous pixel strips are provided in one axis and non-ferrous pixel strips are provided in the other axis, with the coupling elements for the respective axis being adapted to field couple with the pixels of interest. The coupling elements are generally coils connected in oscillator circuits but some are capacitors. The mouse motion and direction of motion can be expressed in a "gray" code derived from the phase-shifted outputs or can be based on analysis of the outputs with switching between the phase-shifted output signals at ambiguity points.

22 Claims, 19 Drawing Figures

Fig. 15.
|  | $X_A$ | $X_B$ |
|---|---|---|
| $S_1$ | 1 | 0 |
| $S_2$ | 1 | 1 |
| $S_3$ | 0 | 1 |
| $S_4$ | 0 | 0 |
| $S_5$ | 1 | 0 |
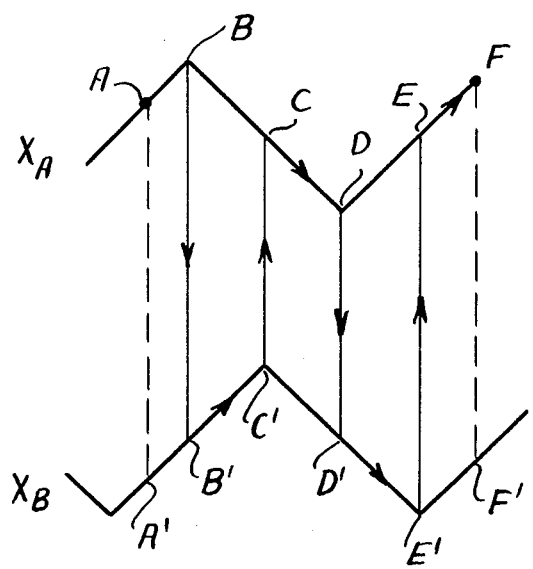
Fig. 16.
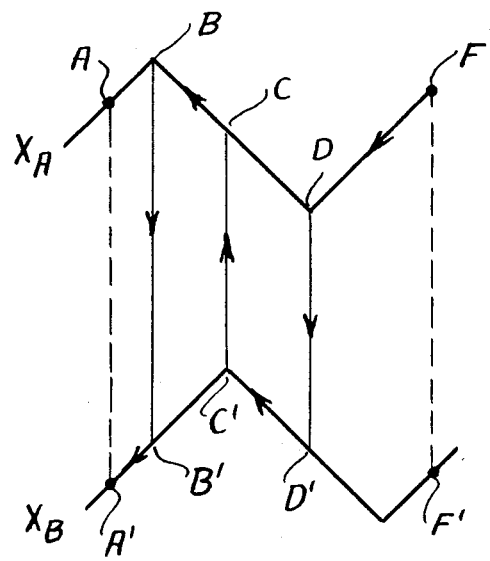
Fig. 17.

FIELD-COUPLED POINTING DEVICE

BACKGROUND OF INVENTION

This invention relates to a pointing device in which communication between a patterned passive surface and a movable mouse is established by electrical field coupling, wherein mouse motion on the passive surface creates data signals indicative of the extent and direction of movement.

Pointing devices which are the very general subject of this invention are commonly referred to as "mice". The earliest mouse device was electromechanical, and used a pair of wheels which were rolled across a passive surface to turn potentiometer shafts providing an analog signal related to motion. Improvements included utilizing a single ball as the rolling element, and utilizing optical shaft encoders to detect rotation of the rolling element. Nevertheless, the electromechanical mouse has never been outstandingly reliable. An inherent problem is slippage on the work surface, and it is also difficult to protect the mechanical structures from dirt. Additionally, the electromechanical mouse is expensive to fabricate.

More recently, mouse developments have been directed toward optical design principles, relying on light provided from a source in the mouse body and reflected back from a patterned, passive grid. Optical mice overcome the problem of slippage associate with electromechanical mice, but are limited in application because drawings or papers cannot be interposed between the mouse and the passive mouse surface. In addition, the mouse surface must remain clean to avoid spurious signals.

Thus, there is a need for an improved mouse pointing device.

A pointing device or mouse according to the invention herein comprises a mouse tablet and a mouse movable thereon wherein electrical field coupling is utilized to ascertain movement of the mouse on the mouse tablet. The mouse tablet preferably comprises a repetitive, regular pattern of spaced-apart conductive pixels. The pixels are conveniently provided on a printed circuit board and covered with a thin layer of dielectric material to provide a smooth data surface. The mouse comprises a housing movable on the mouse tablet, the housing containing coupling elements which electrically field couple with the pixels, the degree of coupling depending upon the position of the coupling elements with respect to the pixels. The mouse further comprises circuit means for establishing an electrical field from the coupling elements and means for detecting changes in that field, and such circuit means may be mounted in the mouse housing. When the mouse is moved on the mouse tablet, the coupling elements pass sequentially over the conductive pixels and the non-conductive areas therebetween, position-dependent coupling with the pixels producing output signals indicative of the motion of the mouse.

In accordance with more specific aspects of the invention, two coupling elements are provided for each of the x-axis and y-axis, in order that the direction of mouse motion may be ascertained. The x-axis coupling elements are spaced apart to provide phaseshifted output signals, which can be utilized to ascertain direction of mouse motion in the x-axis. The y-axis coupling elements are also spaced apart to provide phase-shifted outputs for ascertaining direction of y-axis mouse motion. In one embodiment, the pixels may be square and separated from adjacent pixels by the width of the square. Each x-axis coupling element covers a plurality of pixels arrayed in the y-axis, so that movement of the mouse in the y-axis has a negligible effect on coupling with the x-axis coupling elements. The y-axis coupling elements are perpendicular to the x-axis coupling elements, and are also elongated along the x-axis to cover a plurality of pixels.

The coupling elements may each comprise an elongated coil connected in an oscillator circuit. In combination with nonferrous pixels, positioning of the coil over pixels reduces the inductance of the coil, whereby the frequency of the oscillator increases. Thus, the frequency of the oscillator can be monitored to determine mouse movement across the pixels. In combination with ferrous pixels, the frequency of the oscillator decreases over pixels as compared to the frequency of oscillation between the pixels, which also indicates mouse movement. Comparing the voltage across the input and output of the oscillator can also be carried out to derive a signal dependent on the position of the coil with respect to pixels.

The coupling elements may also be elongated conductive strips which comprise one plate of a compacitor. In this embodiment, the mouse housing has mounted therein a conductive guard ring which comprises a plate of a second capacitor sufficiently large to have uniform coupling with the mouse surface independent of mouse position, the guard ring also providing a return path to the coupling element. The mouse tablet, in addition to having conductive pixels, has a conductive backing to complete a coupling loop between the coupling elements and the guard ring. The capacitance between the coupling elements and the mouse surface varies depending upon position of the coupling elements with respect to the conductive pixels. The shape of the capacitance coupling elements are similar to that of the coil coupling elements, i.e. elongated perpendicularly to the axis of interest, and two coupling elements are utilized for each axis in order to ascertain the direction of mouse movement.

In another embodiment, the pixels of the mouse tablet are deployed in strips, one axis having evenly spaced-apart ferrous strips and the other axis having evenly spaced-apart non-ferrous strips. Two coupling element coils are provided for each axis, being spaced-apart to generate phase-shifted output signals in response to mouse movement. The coils for each axis operate at different frequencies wherein the coils are responsive to the pixel material for their respective axes.

The two coupling elements for one axis generate phaseshifted output signals as the mouse is moved in that axis. The out-of-phase output signals from the two coupling elements can be used to generate a digital gray code indicating motion and direction of motion of the mouse on the mouse tablet in the axis, with good resolution. Mouse motion in the other axis is determined from the coupling elements for that axis, in the same manner.

Alternatively, the motion of the mouse on the mouse tablet can be determined by an interpolation method, which includes switching analysis from the output of one coupling element to the out-of-phase output of the other coupling element whenever the output being used to determine mouse motion is at an ambiguity point. Ambiguity points occur where the slope of the output signal changes sign, e.g. when the coupling element is centered over a pixel. At such points, variation in the size of the out-of-phase output signal of the other coupling gives the direction of movement and the size of the signal can be used to derive interpolated motion data. Again, analysis is carried out for each axis.

A pointing device according to the invention is generally utilized with a microprocessor which is used to analyze output signals and derive mouse motion therefrom, and also with a cathode ray tube or similar data display, wherein the output of the pointing device is used to control the position of a cursor dot on the data display, as is known.

It will be noted that the operation of the pointing device does not depend on either a mechanical interface with the mouse surface or an optical interface with the mouse surface wherein materials such as drawings, or the like, can be interposed between the mouse and the mouse tablet without altering its operation. Additionally, the pointing device is highly accurate in that the electrical field coupling between the mouse and the mouse tablet provides a shaped output signal with relatively gradual transition between "on" pixel and "off" pixel positions, whereby the signal can be used to provide information concerning mouse movements in less than the increments of pixel spacing.

Accordingly, it is the principal object of the invention to provide an improved mouse pointing device.

It is an additional object of the invention to provide a mouse pointing device which is highly accurate and responsive to small movements.

It is a further object of the invention to provide a mouse pointing device which operates with drawings or the like on the mouse surface.

It is yet another object of the invention herein to provide a mouse pointing device which is reliable and relatively inexpensive to manufacture.

Other and more specific features and objects of the invention herein will in part be obvious and will in part appear from a perusal of the following description of the preferred embodiments and the claims, taken together with the drawings.

THE DRAWINGS

FIG. 15 is a table illustrating the graph of FIG. 14 in digital format;

FIGS. 16 and 17 are graphs illustrating another data utilization method for ascertaining movement and direction of movement of the mouse in the pointing devices of either FIGS. 1, 8 or 18.

The same reference numerals refer to the same elements throughout the various figures.

DESCRIPTION OF PREFERRED EMBODIMENTS

Figure 1:
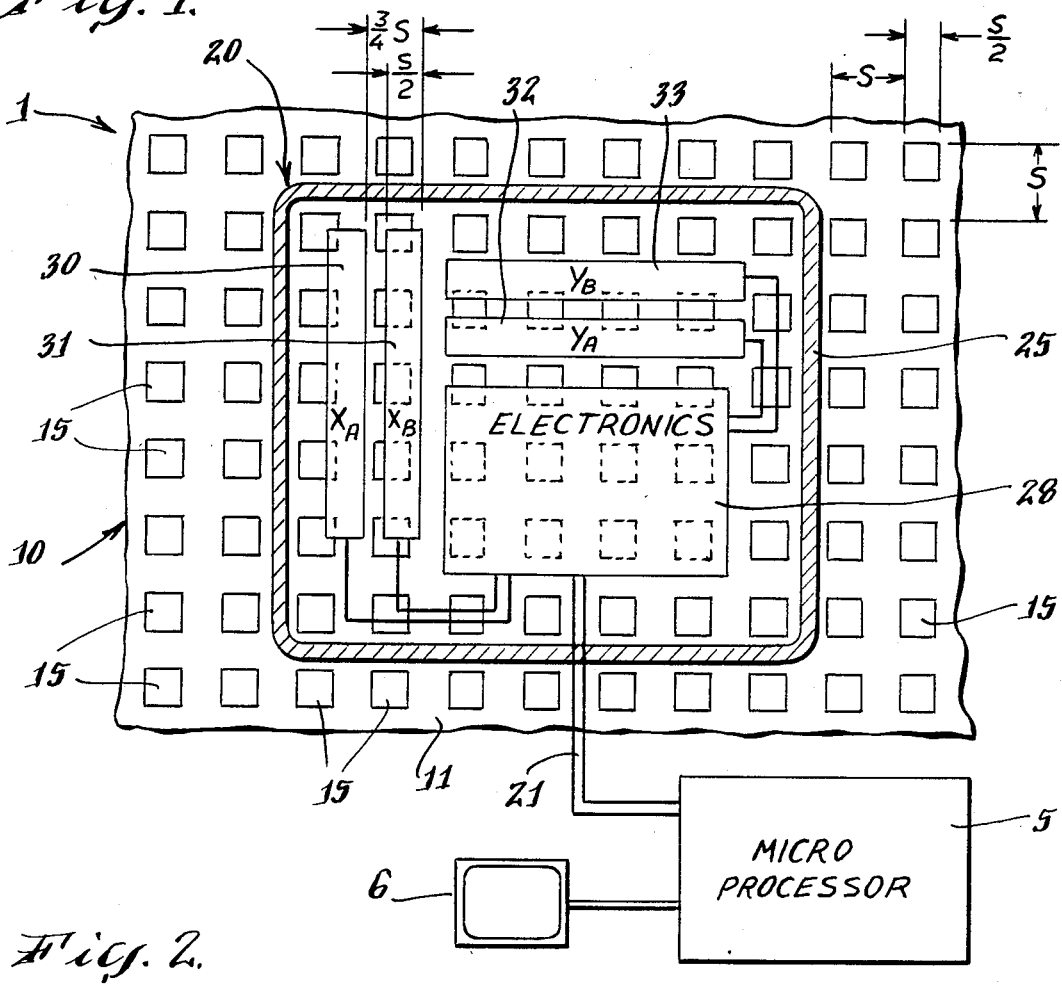
FIG. 1 is a top plan view, partially cut away, of a pointing device according to the invention herein.

Pointing devices according to the invention herein comprise a mouse tablet and a mouse movable on the surface thereof, wherein coupling elements of the mouse establish an electrical field coupling with the mouse tablet, and the coupling varies according to the position of the mouse with respect to conductive pixels deployed on the mouse tablet in a regular, repetitive pattern. A pointing device 1 according to the invention herein is illustrated in FIG. 1 and generally comprises a mouse tablet 10 and a mouse 20, the mouse 20 including coupling elements 30-33 in a housing 25 adapted for movement on the mouse tablet. The pointing device 1 is used in conjunction with a microprocessor 5, which may drive a display means 6.

Figures 2, 3:
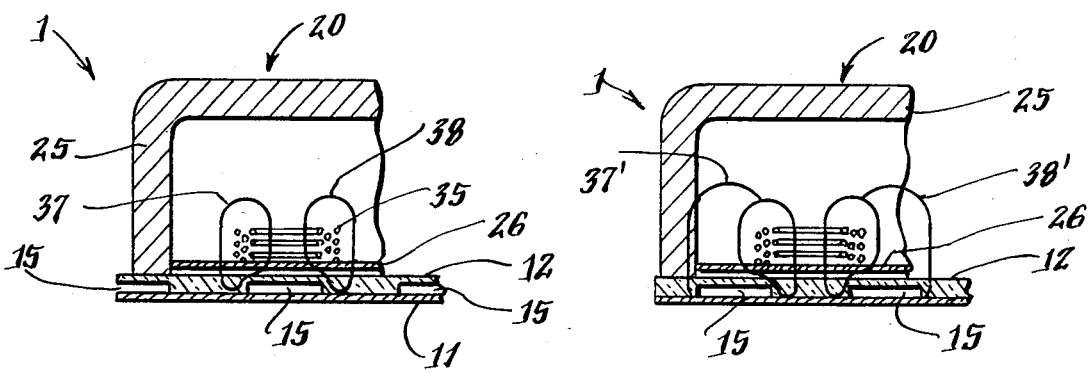
FIG. 2 is a partial sectional view of the pointing device of FIG. 1, with a coupling element centered over a conductive pixel.
FIG. 3 is a partial sectional view of the pointing device of FIG. 1, with a coupling element centered between conductive pixels.

The mouse tablet 10, also seen in section in FIGS. 2 and 3, comprises a plurality of pixels 15 deployed in rows and columns on a base 11. Each pixel 15 may be square, and may comprise copper, silver or any other good conductor deposited on a printed circuit board which may serve as the base 11. Ferrous metals may also be used as the pixels, depending upon design choices further discussed below. A top layer 12 of a dielectric material, such as polyethylene, Mylar or Teflon, covers the pixels 15 and provides a smooth top surface for the mouse tablet. The pixel pattern has a pitch "S", i.e. each pixel and the space separating it from the next adjacent pixel is "S". The pixels themselves may have a dimension of one-half of the pitch "S". It will be appreciated that the size of the pixel is chosen to cooperate with the coupling elements of the mouse 20, and to provide a desired degree of accuracy, but a pitch "S" of one millimeter is suitable for most applications. Of course, the mouse tablet 10 can be of any desired overall size.

The mouse 20 comprises a housing 25 in which the coupling elements 30-33 are supported. The coupling elements are inductance devices, and the coupling element 30 comprises an elongated coil comprised of a plurality of windings 35 (See FIGS. 2 and 3). The width of the coil 30 is preferably the same as the width of the pixels 15, i.e. one half of the pitch "S". The coil is elongated, having a length sufficient to cover a plurality of pixels, and in the preferred embodiment the length is sufficient for the coil to extend for four pixels in the vertical direction. The coupling element 30 is oriented for detecting x-axis motion of the mouse 20, and it will be noted that as the mouse 20 is moved either left or right across the mouse tablet 10, the coupling element 30 sequentially passes over four pixels and over the area between the pixels. The coupling element 31 is also deployed vertically for detecting x-axis motion of the mouse, and the two coupling elements 30 and 31 are sometimes referred to herein as elements $X_A$ and $X_B$, as labelled in FIG. 1. The centers coupling elements 30 and 31 are spaced apart by three-fourths of the pitch "S" of the mouse tablet, whereby the output from the respective coupling elements is phase shifted by 270° and useful for determining direction of mouse motion, as will be more fully discussed below. Of course, the spacing between the coupling elements 30 and 31 could also be five-fourths of the pitch "S" or any other spacing which achieves a phase-shifted output.

Coupling elements 32 and 33 also comprise elongated coils which are identical to the coupling element 30, with the coupling elements 32 and 33 being deployed perpendicular with respect to the coupling elements 30 and 31. Thus, the coupling elements 32 and 33 are deployed for sensing y-axis motion of the mouse 20, and are also sometimes referred to as the $Y_A$ and $Y_B$ coupling elements, as shown in FIG. 1. They are also spaced apart by three-fourths of the pitch "S" to provide a phase shifted output signal.

The coils comprising the coupling elements 30–33 are mounted on a bottom panel 26 of housing 25, which supports the coils in close proximity to the surface of the mouse tablet 10. The mouse 20 further comprises a cord 21 which connects the mouse with a microprocessor 5 or other output utilization device, and also provides power to the mouse. Electronics, generally indicated at 28 may be included within the mouse housing 25, the circuitry being described in more detail below. Lastly, the mouse housing 25 can have various switches and controls thereon as is known in mouse art, e.g. for "zeroing" the mouse position, providing "stop" and "start" functions, and the like. The microprocessor drives a display means 6, which may be a cathode ray tube displaying a cursor dot positioned on the screen by the mouse.

The general principle of operation of the pointing device 1 is illustrated in FIGS. 2 and 3. The circuitry 28 is used to establish an AC signal which is applied to the coil 35 comprising the coupling element 30. The AC signal in the coil 35 creates a changing field having flux loops about the coil, flux loops 37 and 38 being shown. The flux loops interact with, or electrically field couple with the pixels. With reference to FIG. 2, pixel 15 in the form of a copper square (actually a plurality of aligned copper squares) is positioned under the center of the coil 35. Copper excludes alternating fields; therefore, the pixels reduce the inductance of the coil, and the reduced inductance can be detected to indicate the coupling element 30 is over pixels. In FIG. 3, the coupling element 30 is shown a position between pixels, and the flux loops 37', 38' are less excluded from the center of the coil, thereby having less reducing effect on the inductance. The presence of the pixels under a coupling element can be detected by connecting the coil of the coupling element as the inductance "L" of an LC oscillator. The position of the coupling element with respect to pixels can be ascertained by monitoring the oscillator frequency. In addition to the change in frequency, eddy current losses occur when the coil is over pixels, whereby the position of the coupling element with respect to pixels can be determined by connecting the coil in a series resonant frequency and measuring the Q of the coil.

Figure 4:
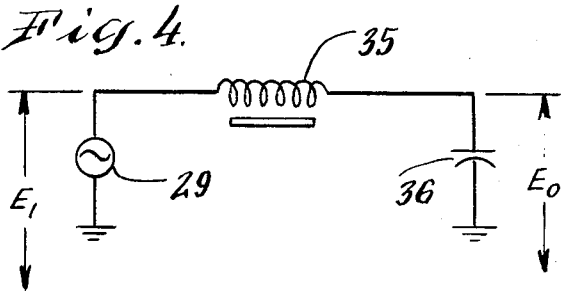
FIG. 4 is a circuit diagram, illustrating operation of the pointing device of FIG. 1.
Figure 5:
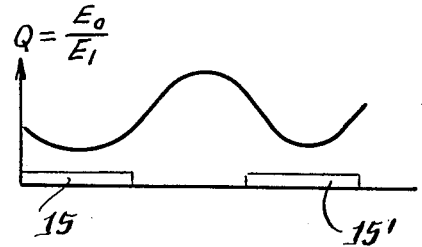
FIG. 5 is a graph of the operation of the circuit of FIG. 4 wherein output signal is dependent on the position of a coupling element with respect to pixels of the mouse tablet.

The second detection method is illustrated in FIGS. 4 and 5. In FIG. 4 the coil 35 of coupling element 35 is connected with capacitor 36 in a series resonant circuit including an AC signal source 29. This circuit, together with means for detecting the voltage $E_1$ across the signal source and the voltage $E_0$ across the capacitor may be part of the electronics" 28 in the mouse housing. The oscillator frequency is selected to be tuned at least approximately without the presence of pixels under the coil. The voltage $E_1$ across the oscillator and the voltage $E_0$ across the capacitor are related as $Q = E_0/E_1$. With reference to FIG. 5, a graph of Q versus the coupling element's position with respect to pixels 15 shows the Q is low when the coupling element is positioned over a pixel, and rises when the coupling element is between pixels and decreases as the coupling element again approaches a pixel. FIG. 5 also illustrates the need for two coupling elements for each axis if direction of motion is to be determined. If the coupling element is between pixels 15 and 15', producing a high Q, and is then moved, the signal Q drops off equally for right or left motion. The out-of-phase outputs of the two coupling elements for each axis resolve this, as discussed below.

Figure 6:
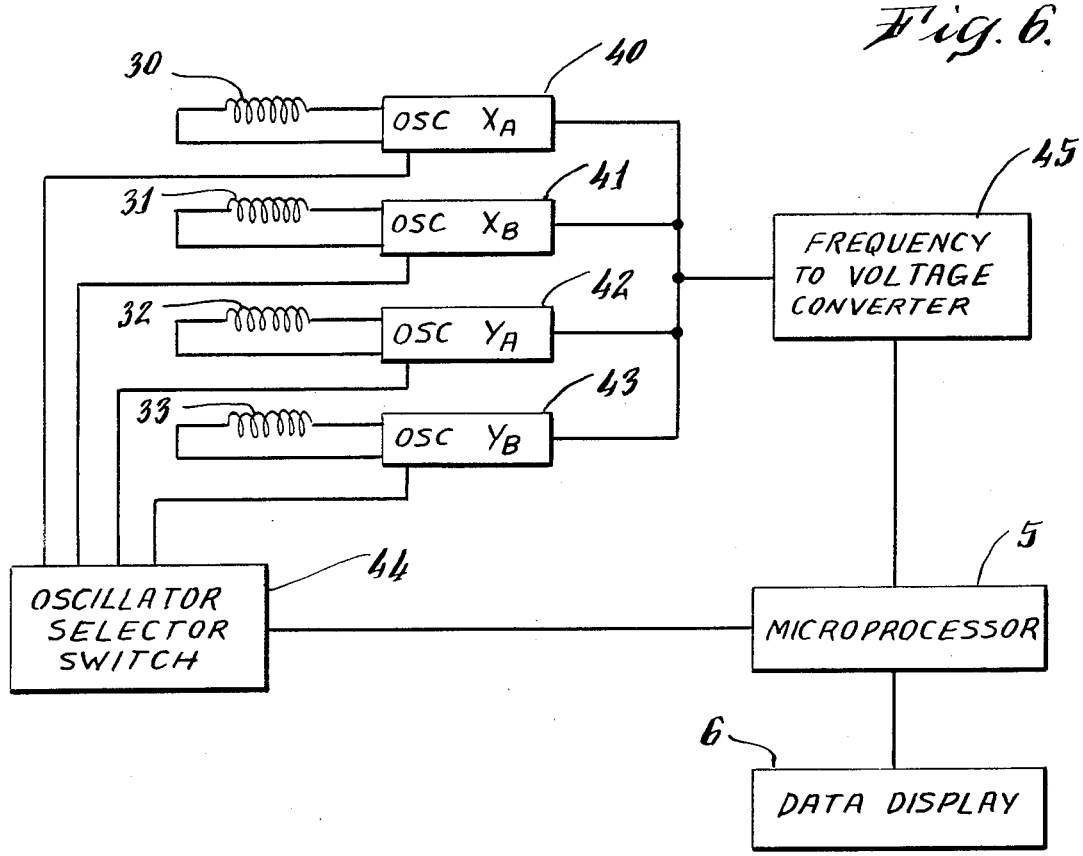
FIG. 6 is a schematic circuit diagram of electronics of the pointing device of FIG. 1.
Figure 7:
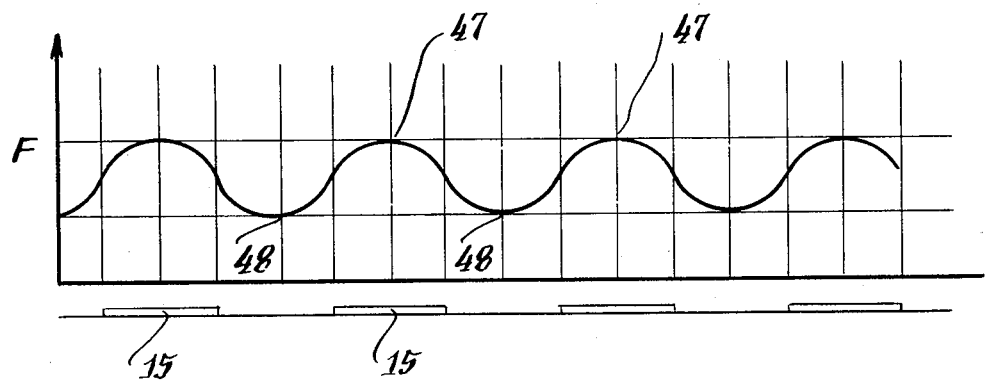
FIG. 7 is a graph of the operation of the circuit of FIG. 6.

With reference to FIGS. 6 and 7, the mouse motion can also be ascertained via frequency detection methods. More specifically, each of the coupling elements 30–33 are respectively connected in oscillator circuits 40–43 wherein each circuit is sequentially active via switches 44 under control of microprocessor 5. The oscillator circuits 40–43 are turned on sequentially for a short time period, during which the frequency of the active oscillator is converted to a voltage signal via converter 45, the voltage signal being provided to the microprocessor. The voltage signal provided to the microprocessor is therefore frequencydependent. The frequency is a function of the inductance of the coupling element in the oscillator circuit which is in turn controlled by the position of the coupling element with respect to the pixels. FIG. 7 shows a graph of the frequency versus position of the coupling element with respect to pixels, noting that the peak frequency at 47, comes when the coupling element is centered over pixels and the lowest frequency at 48, occurs when it is between pixels. (The frequency variation is exaggerated for illustration.)

It will be appreciated if the pixels are fabricated of a ferro-magnetic material, the oscillator frequency will go down when the coupling element is over a pixel as compared to the oscillator frequency when the coupling element is between pixels. This also provides a suitable basis for obtaining an output signal which is related to the position of the coupling elements with respect to the pixels, e.g. the FIG. 6 signal would be inverted.

Figure 8:
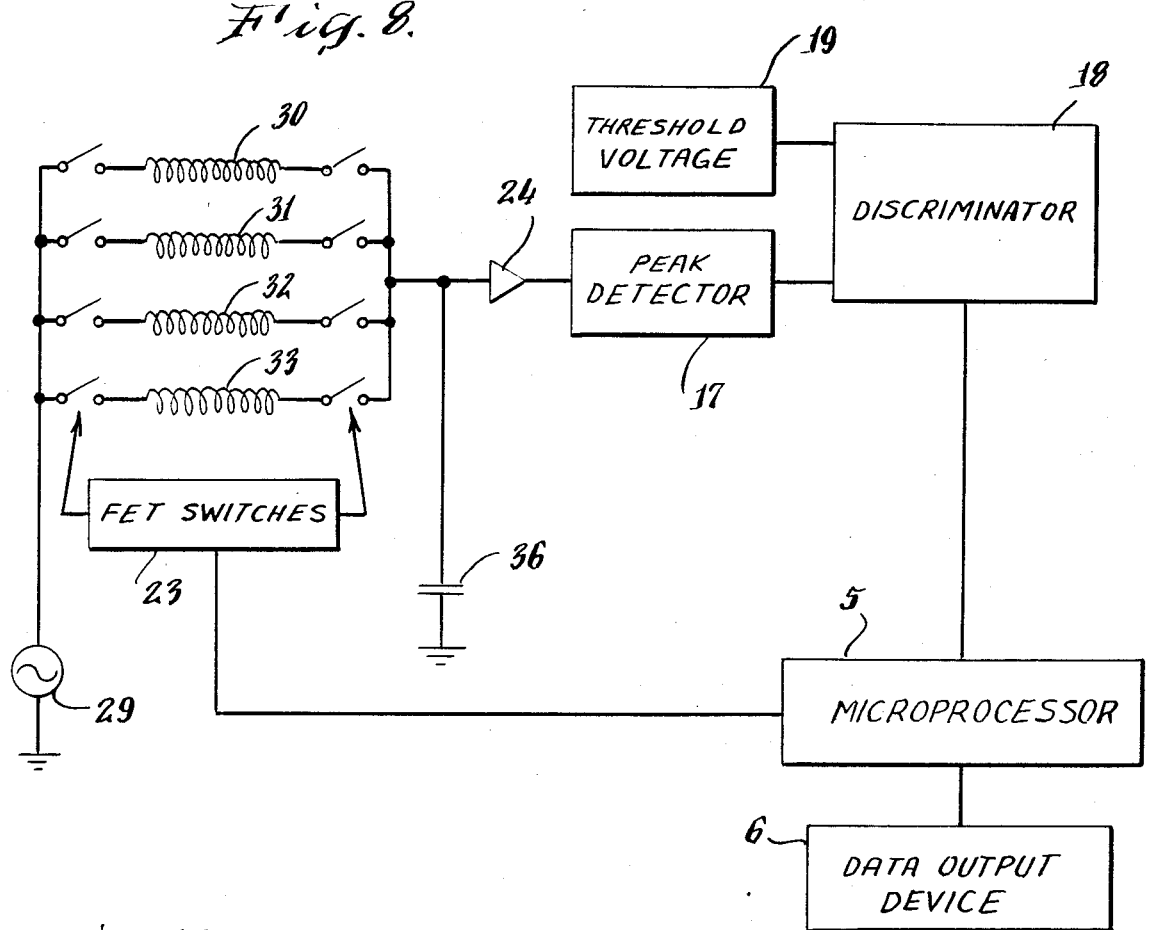
FIG. 8 is a schematic circuit diagram of alternative electronics for the pointing device of FIG. 1.

With reference to FIG. 8, alternative electronics are shown to derive outputs from the four coupling elements 30–33 of mouse 20. The coils comprising the coupling elements 30–33 are connected as "L" in an "LC" oscillator circuit, including AC signal source 29 and capacitor 36, with each coupling element being individually connectable into the circuit via FET switches 23 under control of microprocessor 5. Thus, an output for each of the coupling elements 30–33 is carried out sequentially. The voltage $E_0$ across the capacitor is buffered by a high impedance amplifier 24, and the output voltage is converted to DC by a peak detector 17 and fed to a discriminator 18, set by a threshold voltage supply 19. The output voltage is then read by a microprocessor, wherein the microprocessor also controls the FET switches and can thereby identify the output of the individual coupling elements.

More detailed dicsussion of the use of the output signals in determining mouse motion will be had below, after discussion of additional embodiments for obtaining an output signal.

Figure 9:
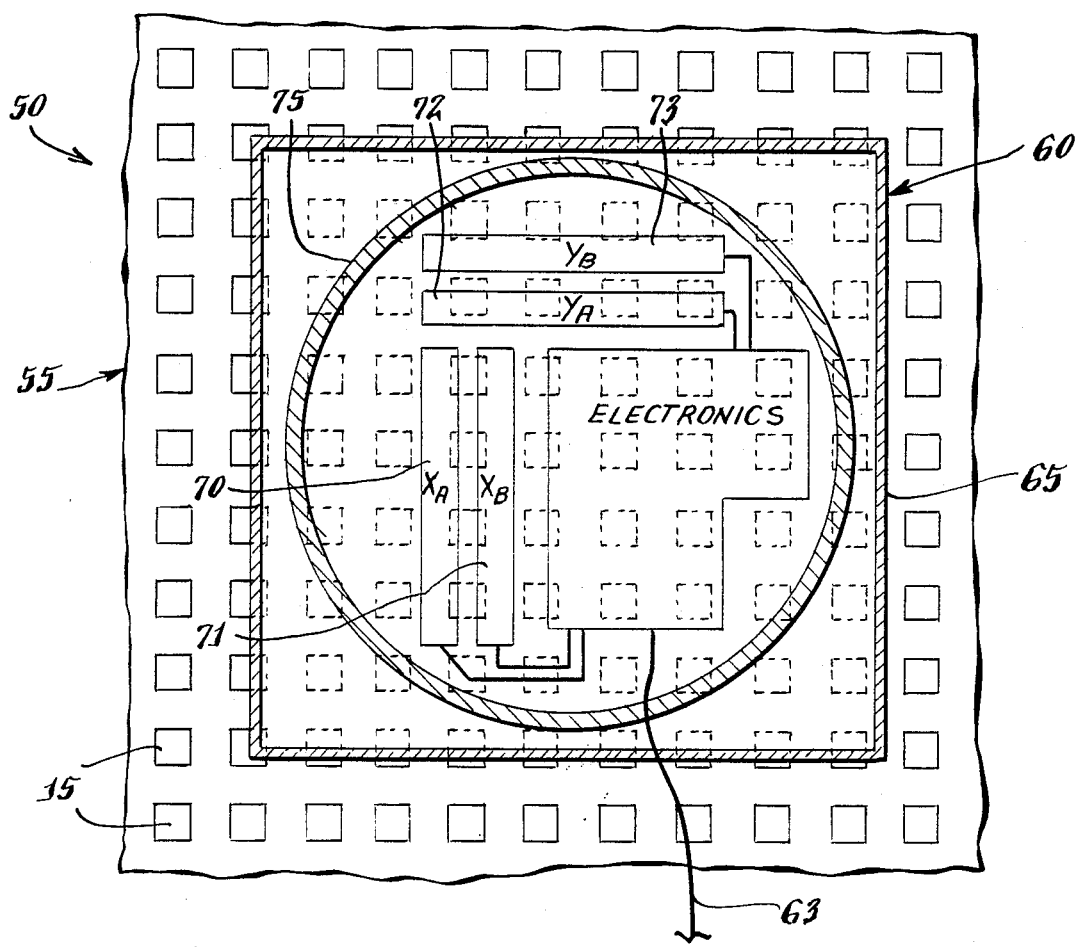
FIG. 9 is a top plan view, partially cut away, of another pointing device according to the invention herein.
Figure 10:
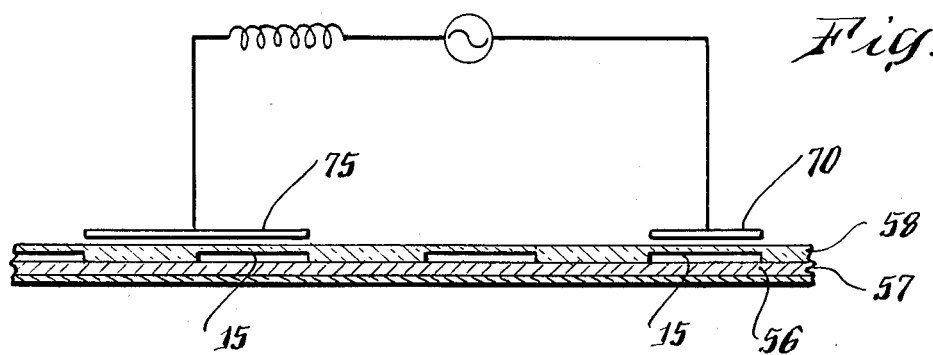
FIG. 10 is a schematic sectional view of the pointing device of FIG. 9, showing the operation thereof.

With reference to FIGS. 9 and 10, a second pointing device 50 according to the invention herein is illustrated. The pointing device 50 differs from the pointing device 1 described above in that the field coupling between the mouse and mouse tablet is established via electrostatic coupling principles, i.e. capacitance coupling. The pointing device 50 generally comprises the mouse tablet 55 including a plurality of pixels 15 deployed in rows and columns, and a mouse 60 including coupling elements 70–73. With reference to FIGS. 9 and 10, the mouse tablet 55 comprises a conductive bottom layer 56, and a dielectric intermediate layer 57, with the pixels 15 being deployed on the upper surface of the intermediate layer. The intermediate layer may be a printed circuit board, with the pixels printed on the top side thereof and the conductive backing on the bottom side thereof. The pixels are covered with an upper layer 58 comprised of a good dielectric material, such as polyethylene, etc. The pixels 15 may have the same arrangement as described above with respect to the mouse tablet 10, i.e. the pixels may be deployed in rows and columns having pitch "S", with each square pixel having sides which are one-half of the pitch "S."

The mouse 60 comprises the four coupling elements 70–73 mounted in housing 65, each of which may be a conductive plate which functions as one plate of a capacitor. Each coupling element is preferably the same in width as a pixel, and has a length sufficient to embrace a plurality of pixels, e.g. four or five. The coupling elements 70 and 71, also designated $X_A$ and $X_B$, are deployed vertically for sensing motion of the mouse in the horizontal or x-axis, and the coupling elements 72 and 73, designated $Y_A$ and $Y_B$, and deployed horizontally for sensing motion of the mouse in the vertical or y-axis.

The coupling elements of mouse 60 further include a conductive guard ring 75 which may conveniently surround the four coupling elements within the mouse housing 65. The guard ring also functions as a capacitor plate for establishing capacitance coupling with the mouse tablet. The mouse 60 further comprises electronics 62 including circuitry for establishing capacitive coupling with the mouse tablet through the coupling elements, the electronics being connected via a lead 63 to data utilization and display means, not shown. The capacitance coupling between the guard ring and the mouse tablet is not affected by the position of the guard ring with respect to the pixels, because the guard ring covers approximately the same pixel area in all positions. On the other hand, the capacitance between the coupling elements and the tablet is dependent upon the position, in the axis of interest, of the coupling elements 70–73 with respect to the copper pixels. This is illustrated schematically in FIG. 10, wherein the capacitance between the coupling element 70 and the mouse tablet and the capacitance between the guard ring coupling element 75 and the mouse tablet are series connected as the C of an LC oscillator circuit. The frequency of oscillation varies according to the capacitance, and the capacitance varies according to the position of coupling element 70 with respect to the pixels. The guard ring 75 is illustrated as being over both a pixel and a space between pixels, to illustrate that its capacitance is not position dependent. The frequency of the oscillation circuit drops when the coupling element 70 is over a copper pixel.

Figure 11:
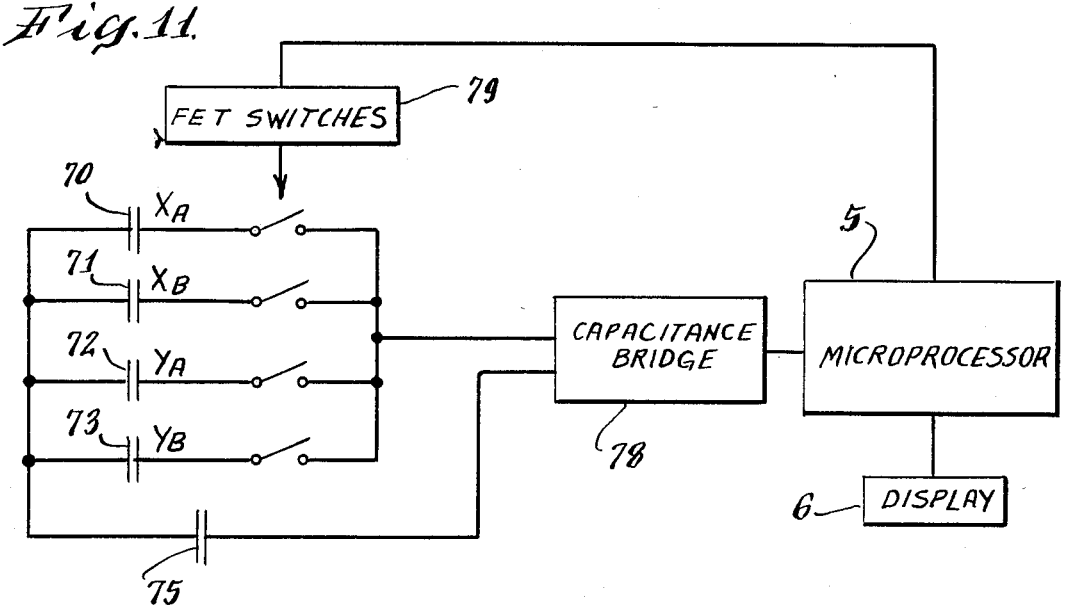
FIG. 11 is a schematic circuit diagram of electronics for the pointing device of FIG. 9.
Figure 12:
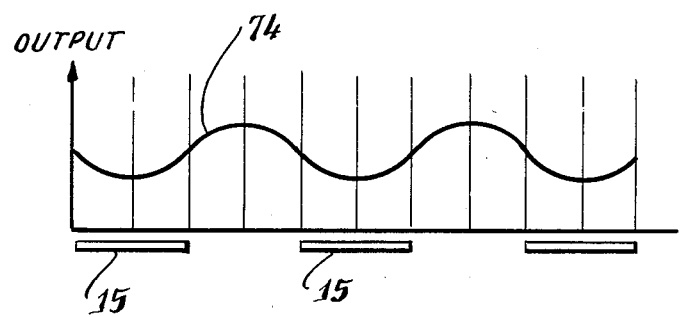
FIG. 12 is a graph of the output of the circuit of FIG. 11 with respect to the location of one coupling element.

The coupling elements 70–73 can be connected into the oscillator circuit sequentially by FET switches and the frequency of the oscillator is sampled for each coupling element, similar to the detection schemes shown above in FIGS. 6 or 8. Alternatively, and as illustrated in FIG. 11, the coupling elements 70–73 can be sequentially connected into a capacitance bridge 78 under control of switches 79, the bridge also having the capacitance between the guard ring 75 and the mouse tablet also being in the circuit. The microprocessor 5 controls the switching, receives the data, and determines mouse motion therefrom. For either electronics scheme, FIG. 12 illustrates that the output signal 74 from coupling elements 70–73 varies as the coupling elements are moved with respect to the pixels.

Figure 18:
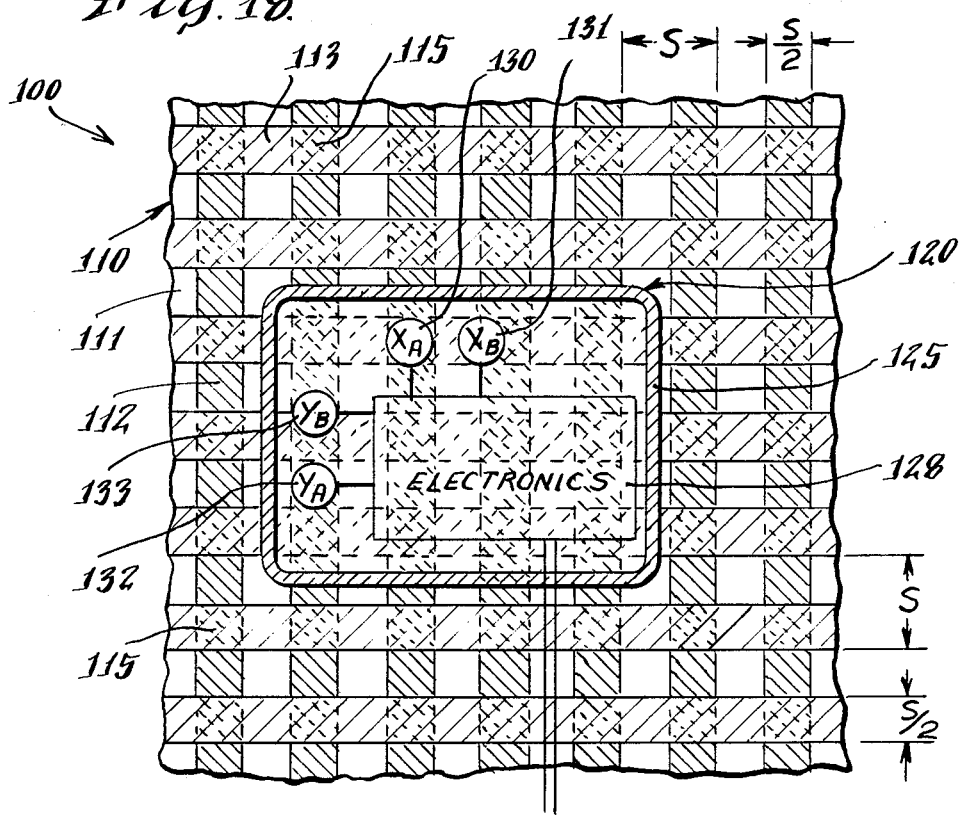
FIG. 18 is a top plan view, partially cut away, of another pointing device according to the invention herein.
Figure 19:
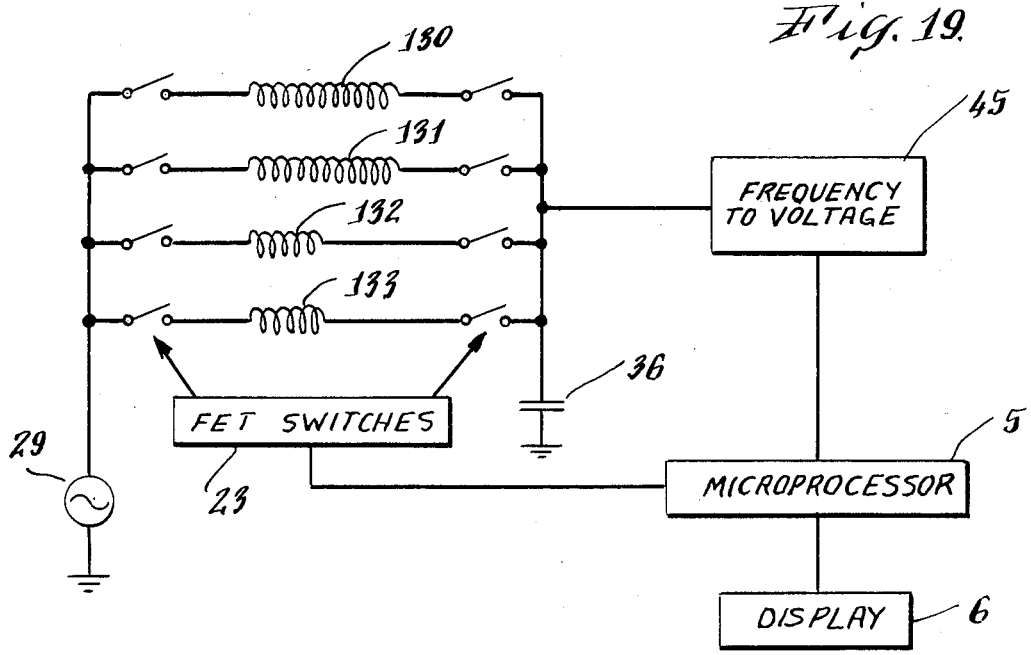
FIG. 19 is a schematic diagram of electronics for the pointing device of FIG. 18.

With reference to FIGS. 18 and 19, there is shown another pointing device 100 according to the invention herein, again generally comprising a passive mouse tablet 110 and a mouse 120 movable thereon. The pointing device 100 also operates on the principle of electrical field coupling between coupling elements of the mouse and pixels of the mouse tablet, with coupling dependent on position with respect to pixels.

The mouse tablet 110 comprises a non-conductive base 111 bearing x-axis pixel strips 112 and y-axis pixel strips 113, covered by a thin layer of polyethelyne or the like to provide a durable, smooth surface. The pixel strips 112 and 113 are selected to provide distinguishable field-coupling with the mouse 120. To this purpose, the vertical x-axis strips are fabricated of a ferromagnetic material, such as nickel or merely iron. The x-axis strips are vertically oriented so that a coupling element movement in the x-axis will be across the strips. The strips may have pitch "S" and be S/2 wide. The y-axis strips 113 are fabricated of a non-ferrous material, e.g. copper. The y-axis strips are horizontally deployed, with pitch "S" and width S/2. The x-axis and y-axis strips occupy the same area where they cross, as indicated at 115. Such areas do not affect performance of the pointing device 100, and either strip may be on top. The base 111 may be a printed circuit board, with the strips being printed thereon.

The mouse 120 generally comprises a housing 125 mounting coupling elements 130-133. Each coupling element is a coil connectable in an oscillator circuit comprising the electronics 128 of the mouse. The oscillator circuit being shown schematically in FIG. 19.

The x-axis coils 130 and 131, also labelled $X_A$ and $X_B$ are round coils having a diameter of S/2, or one-half of the pitch "S". The centers of the coils are separated by three-fourths "S", to produce phase-shifted output signals. The x-axis coils are provided so that when connected in an oscillator circuit, the tuned frequency is in a range which is responsive to the presence of ferrous strips under the coil. This frequency may be in the 50–100 KH range, e.g. 70 KH. In this frequency range, the coils are not responsive to the non-ferrous strips, and the position of the x-axis coils with respect to y-axis pixel strips 113 does not affect the output signal. Each x-axis coil will produce an output signal such as is shown in FIG. 12 for mouse motion in the x-axis pixel strips.

The y-axis coils 132, 133 are similarly sized and spaced, but are deployed for sensing motion across the y-axis pixel strips. The y-axis coils are selected so that when connected in an oscillator circuit, the tuned frequency is in a range responsive to the presence of non-ferrous strips under the coil. Frequencies in the range of 50–100 MH (e.g. 70 MH) suffice, and the coils are not responsive to the ferrous strips at such frequencies. Thus, when the mouse 120 is moved across the mouse tablet in the y direction, the y-axis coupling coils 132, 133 each produce an output signal dependent on position with respect to the y-axis pixel strips 113, such as is shown in FIG. 7, without being affected by the ferrous x-axis pixel strips 112.

FIG. 19 shows circuitry for the pointing device 100, wherein the coupling elements 130–133 are sequentially connected in an oscillator circuit including AC source 29 and capacitor 36. The particular coil connected determines the oscillator frequency, and hence the active pixel strips.

The pointing device 100 is advantageous in that it does not require elongated coils, whereby the mouse is less sensitive to being properly oriented on the tablet in order to get good results.

Figure 13:
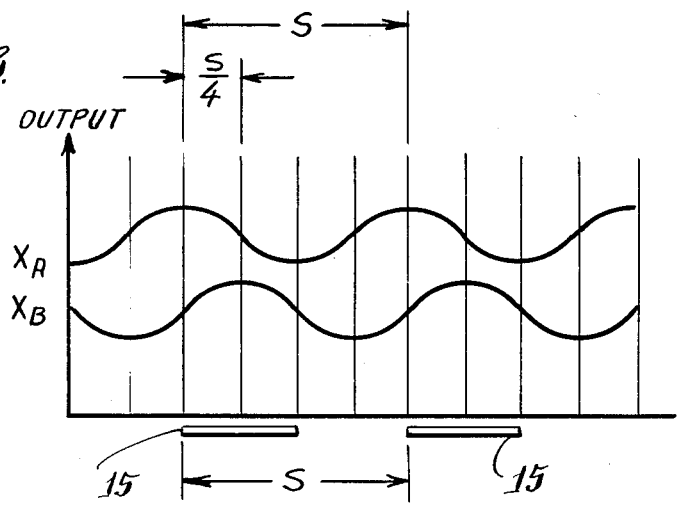
FIG. 13 is a graph illustrating operation of the pointing devices of either FIGS. 1, 8 or 18.

Turning now to discussion of utilizing signals derived from the coupling elements to ascertain mouse motion on the mouse tablet, with reference to FIG. 13, there is shown a graph of the output signals from the coupling elements $X_A$ and $X_B$ versus the position of the coupling elements with respect to pixels on the mouse tablet. The output signals may be from any of the embodiments described above, with inverters used as required to produce the signals shown. The outputs signals for the coupling elements $X_A$ and $X_B$ are shown spaced apart on the vertical scale for clarity, although they may have the same peak value, as desired for further data computations as established by the circuitry. The graph does not indicate signal versus time, and during periods of no mouse motion, the signal would merely be stable at the given level for the position of the mouse at that time. It is assumed that the output signal, whether derived from frequency, voltage, or capacitance, is represented by the figure. It will be noted that the signals are repetitive with a period S, the period S representing the same distance as the pitch "S" on the mouse tablet. The output signal $X_B$ has its peak value when the corresponding coupling element is centered over a pixel, and its minimum value when the coupling element is centered between pixels. The signals $X_A$ and $X_B$ are out of phase by 90° (or 270°, depending on the reference point), reflecting the odd multiple of S/4 spacing between the coupling elements. Although the output of a single coupling element could be used to detect motion in a known direction, the spaced apart dual coupling elements permit direction of motion to be ascertained as well. Data signals from the $Y_A$ and $Y_B$ coupling elements are similar.

According to a first data utilization method, each of the signals is converted to a "zero" or "one" bit value, and the combined values from the two coupling elements provide a digital code indicating position. By comparison with the previous position, motion can be determined. The circuitry of FIG. 8 is well-adapted to carry out this method, which is further illustrated in FIGS. 14 and 15.

Figure 14:
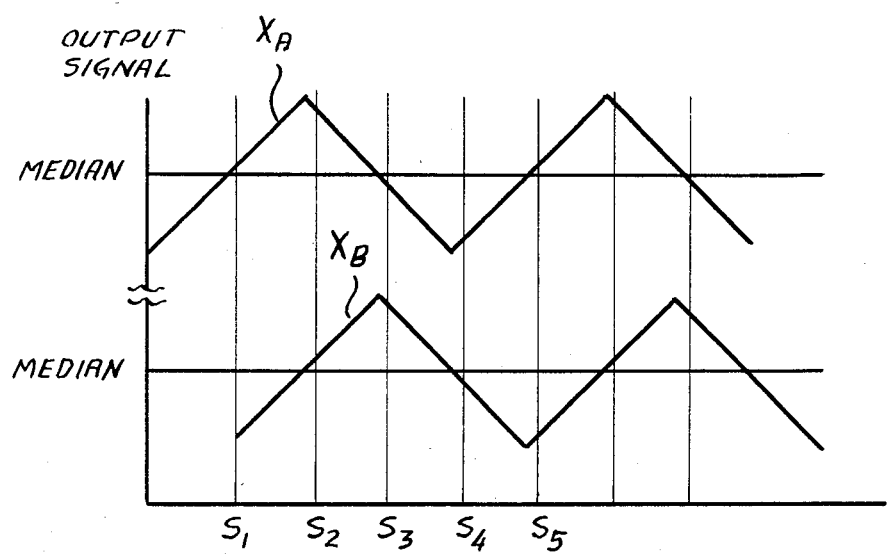
FIG. 14 is a graph illustration of a data utilization method.

More particularly, discriminator 18 of FIG. 8 is biased to change state from "zero" to "one" at the mid-value of an output signal from the coupling element, i.e. the discriminator will have an output of "one" if the signal is above its median value and will have an output of "zero" if the signal is below its median value. In FIG. 14, the output signals from coupling elements $X_A$ and $X_B$ are shown shaped into sawtooth configuration for purposes of illustration, and a line is drawn indicating the median value at which the discriminator changes state. Looking at the chart of FIG. 15, it sets forth the digitized output of the coupling elements $X_A$ and $X_B$ for each of the positions $S_1$–$S_5$ shown in FIG. 14. Thus, at the position $S_1$ to $X_A$ signal is above the median line and has the value "1", and the $X_B$ signal is below the median line and has the value "0", whereby the code for position $S_1$ is "10". From FIG. 14, it can be seen that for position $S_2$ the code is "11"; for position $S_3$ the code is "01", and for position $S_4$ the code is "00". The code for position $S_5$ is again "10", position $S_5$ being the beginning of a new cycle of the signal corresponding to interaction of the mouse with the next adjacent pixel. Thus, the code provides an indication of motion and direction of the mouse with resolution of one-fourth of the pitch "S", e.g. if the mouse is moved from position $S_2$ to $S_3$, the code changes from "11" to "01", which is readily interpreted as indicating movement of one-fourth of the pitch "S" to the right. The position code so generated is a "gray" code, i.e. a code in which one bit at a time changes thereby avoiding ambiguity and error. Of course, the same analysis is carried out for the $Y_A$ and $Y_B$ signals to determine mouse motion and the direction thereof in the Y-axis.

The slope of the output signal from either of the $X_A$ or $X_B$ coupling elements, i.e. whether the signal is increasing or decreasing for a given increment of motion, is a true indication of direction of motion, and the value of the signal can be used for interpolated position determination.

Another method of data utilization is illustrated in FIGS. 16 and 17. FIGS. 16 and 17 each depict the out-of-phase output signals from coupling elements $X_A$ and $X_B$, presented in sawtooth configuration for ease of discussion. Points on the $X_A$ signal are marked A–F, and these points correspond to positions on the mouse tablet. Corresponding points on the $X_B$ signal are marked A'–F'.

Thus, with reference to FIG. 16, if the mouse is at point "A" and is moved to the right, to a point "B", this motion can be ascertained by noting the increase in the $X_A$ signal. However, once at the point "B", any further movement of the mouse in either direction will produce a decrease in the $X_A$ signal; therefore, once near or at the peak (or low point) of a signal, the signal is no longer suitable for ascertaining the direction of motion. Thus, when the mouse approaches the point "B" as determined by monitoring of signal $X_A$, the interest is switched to point B' on the $X_B$ signal. With respect to point B', any movement of the mouse to the right will be reflected by an increase value of the signal, while any movement to the left will be reflected by a decreased value thereof. Again, assuming that the mouse is being moved to the right, the motion can be ascertained by following the increase of the $X_B$ signal from point B' to point C'. Peak signals being unsuitable for accuracy, as noted above, at point C' of the $X_B$ signal, interest is switch to point C on the $X_A$ signal. The method of switching from one signal to another to avoid analysis at peaks and minimum points of the signals is utilized to trace the movement of the mouse to the right through points D(D') and E' (E) to point F. FIG. 17 illustrates this method of signal analysis utilized for left-hand motion of the mouse, beginning at point F and returning to point A' (which is the same position as point A), again switching from the output signal of one coupling element to the output of the other at peaks and minimum points to avoid any ambiguity in determining direction. The extent of motion is ascertained by the number of high and low points encountered, i.e. a shift occurs for each S/4 movement, and further resolution can be had by interpolation from the change in signal value. It will be appreciated that this analysis is easily performed in a microprocessor for each of the x-and y-axes, with the data being used to control the position of a pointer on a screen or in other ways desirable.

The pointing devices described above are illustrative of the invention herein and are believed to achieve the objects thereof. Various changes may be made with respect to the described embodiments. For example, the shapes and materials of the pixels can be different from those described, so long as the pixels establish position-dependent coupling with the mouse coupling elements. As specific examples, the square pixels 15 of mouse tablet 10 could be round, and the conductive and non-conductive areas could be reversed. With respect to the mouse, the spacing between coupling elements must provide phase-shifted output signals, but the degree of phase shifting is not critical. It will also be appreciated that various field generating and detection circuits may be used, and that the circuitry can be made compact and sophisticated, per chip technology. The microprocessor functions may even be carried out on a chip mounted within the mouse housing, if desired. Various button controls may also be provided on the mouse housing, as is known.

Although the pointing devices are well-adapted for use as "mice" in moving a cursor point on a display screen, the pointing devices may also function as digitizers, in that accurate data of mouse motion on the mouse tablet is produced, from which accurate positional data can be derived. Thus, the scope of the invention is limited only by the following claim.

I claim:
1. A pointing device comprising:
    (A) a mouse table having a substantially flat base with a plurality of electrical field-sensitive pixels deployed thereon in a regular, repetitive pattern having an x-axis and a y-axis, including non-pixel areas separating pixels in the x-axis and non-pixel areas separating pixels in the y-axis;
    (B) a mouse including a housing adapted for movement on the mouse tablet, the housing having mounted therein
        (1) first and second x-axis coupling elements, each of the x-axis coupling elements being adapted for establishing electrical field coupling with the pixels which is position dependent with respect to pixels in the x-axis, the first and second x-axis coupling elements being spaced apart in the x-axis such that field coupling established by the first x-axis coupling element is out-of-phase with field coupling established by the second x-axis coupling element, and
        (2) first and second y-axis coupling elements, each of the y-axis coupling elements being adapted for establishing electrical field coupling with the pixels which is position dependent with respect to pixels in the y-axis, the first and second y-axis coupling elements being spaced apart in the y-axis such that field coupling established by the first y-axis coupling element is out-of-phase with the field coupling established by the second y-axis coupling element;
    (C) circuit means connected with said coupling elements for causing said coupling elements to establish electrical field coupling with said pixels, said circuit means having operating parameters which vary according to the position of the coupling elements with respect to the pixels; and
    (D) means detecting variations in the operating parameters of the circuit means and means for determining mouse motion and the direction of mouse motion on the mouse tablet based on said variations in said operating parameters.

2. A pointing device as defined in claim 1 wherein said pixels comprise rows of spaced apart pixels and columns of spaced apart pixels deployed respectively along the x-axis and y-axis of the mouse tablet, and the x-axis coupling elements are elongated to cover a plurality of pixels in the y-axis and the y-axis coupling elements are elongated to cover a plurality of pixels in the x-axis, the elongation being sufficient to provide for substantially uniform field coupling in the direction of elongation.

3. A pointing device as defined in claim 2 wherein the coupling elements have a width approximately the same as the width of an individual pixel.

4. A pointing device as defined in claim 2 wherein the coupling elements are capacitor plates, the mouse tablet has a conductive backing layer separated from the pixels by a dielectric layer, and the mouse further comprises an additional capacitor plate which is large with respect to the pixels to complete a field coupled loop from each of the coupling elements to the conductive backing plate and from the conductive backing plate to the large additional capacitor plate.

5. A pointing device as defined in claim 4 wherein the large additional capacitor plate is a ring surrounding the x-axis and y-axis coupling elements in the mouse housing.

6. A pointing device as defined in claim 4 wherein each capacitor plate coupling element is connected in an LC oscillator circuit to establish field coupling with the pixels.

7. A pointing device as defined in claim 4 wherein each capacitor plate coupling element is connected in an RC circuit to establish field coupling with the pixels.

8. A pointing device as defined in claim 2 wherein the coupling elements are inductor coils.

9. A pointing device as defined in claim 8 wherein the circuit means for causing the coupling elements to establish electrical field coupling with the pixels comprises an LC oscillator circuit, with the inductor coil coupling elements providing inductance in the oscillator circuit, and the inductor coil coupling elements are sequentially connected into the oscillator circuit on a repetitive basis.

10. A pointing device as defined in claim 9 wherein the pixels are fabricated of a diamagnetic material and the oscillator circuit is operated at a frequency wherein the presence of a diamagnetic pixel under one of the inductor coil coupling elements decreases the inductance of said inductor coil coupling element in the oscillator circuit.

11. A pointing device as defined in claim 10 wherein the pixels are fabricated of copper and the base of the mouse tablet is a printed circuit board on which the pixels are deposited.

12. A pointing device as defined in claim 10 wherein the means detecting variations in the operating parameters of the circuit means comprises means for detecting the frequency of the oscillator circuit.

13. A pointing device as defined in claim 10 wherein the means detecting variations in the operating parameters of the circuit means comprises means for determining the Q of the inductor of the oscillator circuit.

14. A pointing device as defined in claim 9 wherein the pixels are fabricated of a ferrous material and the oscillator circuit is operated at a frequency wherein the presence of a ferrous pixel under one of the inductor coil coupling elements increases the inductance thereof.

15. A pointing device as defined in claim 1 wherein the circuit means for causing said coupling elements to establish electrical field coupling with the pixels is an oscillator circuit and further comprising means for connecting the coupling elements into the oscillator circuit on a sequential repetitive basis.

16. A pointing device as defined in claim 1 wherein the first and second x-axis coupling elements and the first and second y-axis coupling elements are each respectively spaced apart such that operation of the circuit means establishes field coupling with the pixels and produces an output signal from each of the first coupling elements which is phase shifted by an odd multiple of 90° with respect to an output signal produced from each of the second coupling elements, and the means determining mouse motion and the direction of mouse motion on the mouse tablet comprises means converting the phase-shifted output signals into a "gray" code output for each of the x and y axes.

17. A pointing device as defined in claim 1 wherein the means for determining mouse motion and the direction of mouse motion on the mouse tablet comprises signal analysis means which, for both axes, examines the ouput signal derived from one of the first and second coupling elements for the axis and determines motion and direction of motion from the slope and size of said output signal, and switches to examination of the slope and size of the output signal from the other of the the first and second coupling elements whenever the output signal under consideration does not provide for making an unambiguous determination of direction of mouse motion on the mouse tablet.

18. A pointing device as defined in claim 1 wherein the pixels comprise spaced-apart ferrous pixel strips deployed in one of the x-axis or y-axis and spaced-apart non-ferrous pixel strips deployed in the other of the x-axis or y-axis, and the circuit means causes the x-axis coupling elements to establish field coupling with the pixel strips extending in the y-axis, and the circuit means further causes the y-axis coupling elements to establish field coupling with the pixel strips extending in the x-axis.

19. A pointing device comprising:
(A) a mouse tablet having a substantially flat surface and incorporating adjacent the surface a plurality of spaced-apart non-ferrous field sensitive pixel strips extending in an x-axis of an x-y coordinate system and a plurality of spaced-apart ferrous pixel strips extending in a y-axis of the x-y coordinate system, said second axis being substantially perpendicular to said first axis;
(B) a mouse including a housing movable on the mouse tablet and
  (1) a first pair of inductors mounted in the housing and positioned spaced-apart to sequentially cross the ferrous pixel strips when the housing is moved in the x-axis direction,
  (2) a second pair of inductors mounted in the housing and positioned spaced-apart to sequentially cross the non-ferrous pixel strips when the mouse is moved in the y-axis direction;
(C) circuit means having operating parameters and establishing an alternating field from the first pair of inductors at a first frequency at which the alternating field couples with the ferrous pixel strips, wherein the position of the first pair of inductors with respect to the ferrous pixel strips affects the operating parameters of said circuit means, said first frequency being selected such that the position of the first pair of inductors with respect to the non-ferrous pixel strips does not significantly affect the operating parameters of the circuit means, said circuit means also establishing an alternating field from the second pair of inductors at a second frequency at which the alternating field couples with the non-ferrous pixel strips, wherein the position of the second pair of inductors with respect to the non-ferrous pixel strips affects the operating parameters of said circuit means, said second frequency being selected such that the position of the second pair of inductors with respect to the ferrous pixel strips does not significantly affect the operating parameters of the circuit means, and
(D) means to detect variations in the operating parameters of the circuit means due to alternating field coupling between the inductors and the pixel strips as the mouse is moved on the mouse tablet, and to provide output signals derived from said variations which are indicative of the position of the mouse with respect to the pixel strips, and means for calculating mouse motion and direction of motion from the output signals.

20. A pointing device as defined in claim 19 wherein the ferrous pixel strips include iron and the first pair of inductors are connected into a circuit oscillating at a frequency in the range of 10–100 KH to establish alternating field coupling with the ferrous pixel strips, and the non-ferrous pixel strips are copper and the second pair of inductors are connected into a circuit oscillating at a frequency in the range of 10–100 MH to establish alternating field coupling with the non-ferrous pixel strips.

21. A method of analyzing data derived from a pointing device consisting of a mouse movable in a first axis across a mouse tablet having a plurality of pixels spaced apart in said first axis, wherein when the mouse is moved across the mouse tablet in said first axis, the data consists of at least two periodic out-of-phase data signals each having high and low points, the data signals being functions of the position of the mouse with respect to individual pixels of the mouse tablet in said first axis as the mouse is moved across the mouse table in said first axis, the method comprising:
(A) examining one of the data signals and determining the amount of motion in the first axis from the size of the data signal and the direction of motion in the first axis from the slope of the data signal; and (B) whenever the data signal being examined is at a high point or a low point, switching to examination of the other data signal and determining the amount of motion in the first axis from the size of the data signal and the direction of motion in the first axis from the slope of the data signal being examined; and (C) determining the total amount of motion in the first axis by counting the number of high points and low points encountered with reference to the direction of motion in combination with determining the amount of motion between high points and low points from the size of the data signal being examined, whereby the results of said analysis are useful in controlling movement of a cursor dot on a monitor of a computer system.

22. A method of analyzing data as defined in claim 21 wherein the mouse of the pointing device is movable across the mouse tablet in a second axis perpendicular to said first axis, the mouse tablet of the pointing device has pixels spaced apart in said second axis and when the mouse is moved across the mouse tablet in said second axis, the data further consists of at least two additional periodic out-of-phase second-axis data signal having high and low points, the secnd-axis data signals being functions of the position of the mouse with respect to individual pixels of the mouse tablet in said second axis as the mouse is moved across the mouse tablet in said second axis. the method further comprising:

(A) examining one of the second-axis data signals and determining the amount of motion in the second axis from the size of the data signal and the direction of motion in the second axis from the slope of the data signal; and (B) whenever the second-axis data signal being examined is at a high point or a low point, switching to examination of the other second-axis data signal, and determining the amount of motion in the second axis from the size of data signal and the direction of motion in the second axis from the slope of the data signal being examined; and (C) determining the total amount of motion in the second axis by counting the number of high points and low points encountered with reference to the direction of motion in combination with determining the amount of motion between high points and low points from the size of the data signal being examined.

* * * * *